(12) United States Patent
Andreev et al.

(10) Patent No.: US 7,266,607 B2
(45) Date of Patent: Sep. 4, 2007

(54) QUASI-HIGH AVAILABILITY HOSTED APPLICATIONS

(75) Inventors: Dmitrii Andreev, Larchmont, NY (US); Gregory Vilshansky, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 1004 days.

(21) Appl. No.: 10/229,647

(22) Filed: Aug. 27, 2002

(65) Prior Publication Data

US 2004/0054712 A1   Mar. 18, 2004

(51) Int. Cl.
*G06F 15/173*   (2006.01)

(52) U.S. Cl. ............... 709/226; 709/220; 709/223; 709/225; 709/238

(58) Field of Classification Search ........ 709/223–226, 709/227–228, 217–219
See application file for complete search history.

(56) References Cited

U.S. PATENT DOCUMENTS

| | | | |
|---|---|---|---|
| 5,495,234 A | 2/1996 | Capp et al. | 340/825.21 |
| 5,721,904 A * | 2/1998 | Ito et al. | 707/8 |
| 5,751,932 A | 5/1998 | Horst et al. | 395/182.1 |
| 5,790,397 A | 8/1998 | Bissett et al. | 364/131 |
| 5,790,776 A | 8/1998 | Sonnier et al. | 395/189 |
| 5,911,038 A | 6/1999 | Jones | 395/180 |
| 5,987,621 A | 11/1999 | Duso et al. | 714/4 |
| 6,049,821 A | 4/2000 | Theriault et al. | 709/203 |
| 6,134,588 A | 10/2000 | Guenthner et al. | 709/226 |
| 6,182,141 B1 | 1/2001 | Blum et al. | 709/227 |
| 6,185,619 B1 * | 2/2001 | Joffe et al. | 709/229 |
| 6,185,695 B1 * | 2/2001 | Murphy et al. | 714/4 |
| 6,195,680 B1 | 2/2001 | Goldszmidt et al. | 709/203 |
| 6,247,141 B1 * | 6/2001 | Holmberg | 714/2 |
| 6,298,381 B1 * | 10/2001 | Shah et al. | 709/228 |
| 6,304,913 B1 * | 10/2001 | Rune | 709/241 |
| 6,339,750 B1 | 1/2002 | Hoyer et al. | 702/182 |
| 6,578,066 B1 * | 6/2003 | Logan et al. | 718/105 |
| 6,594,697 B1 * | 7/2003 | Praitis et al. | 709/225 |
| 6,823,382 B2 * | 11/2004 | Stone | 709/224 |
| 6,963,996 B2 * | 11/2005 | Coughlin | 709/208 |
| 7,016,957 B2 * | 3/2006 | Morimoto et al. | 709/224 |
| 2004/0153821 A1 * | 8/2004 | Kuhmann et al. | 714/38 |

FOREIGN PATENT DOCUMENTS

EP   1109345 A2 *  6/2001

OTHER PUBLICATIONS

Z. Fei, S. Bhattacharjee, M. H. Ammar, and E. W. Zegura, "A Novel Server Technique for Improving the Response Time of a Replicated Service," Proc. IEEE INFOCOM'98 (1998).*

(Continued)

*Primary Examiner*—Glenton B. Burgess
*Assistant Examiner*—Brendan Y. Higa
(74) *Attorney, Agent, or Firm*—John R. Pivnichny

(57) ABSTRACT

A client-server application is provided to clients across a network. Requests from the client are accepted by a reliable proxy and sent to master and standby configurations of the client-server application. Each configuration processes the request to produce master and standby responses respectively. The proxy selects one response based on various criteria including a length being greater than the other response by more than a fixed value. The selected response is returned to the client over the internet. The configuration producing the selected response is thereafter designated as the master configuration. A recovery process may be initiated on the unselected configuration.

4 Claims, 2 Drawing Sheets

OTHER PUBLICATIONS

Rescorla, E. The Secure Hypertext Transfer Protocol. RFC 2660. Aug. 1999.*

IEEE Computer Society, "Carrier Sense Multiple Access With Collision Detection (CSMA/CS) Access Method and Physical Layer Specification", IEEE Standard for Information Technology 802.3, 1988, pp. 56.*

Shirvani, et al., Fault-Tolerance Projects at Stanford CRC, Center for Reliable Computing, Stanford University, printed Apr. 2002.

Goal, Pfister, Advanced Service Adapter for High-Availability Computer Systems, TDB, v36 n12 12-93 p. 367.

Using WebLogic Server Clusters Overview, BEA Systems, Inc., 2000, http://www.weblogic.com/docs45/cluster/overview.html ServerIron Internet Web Switches, Lidcam, 2001, www.weblogic.com/docs45/cluster/overview.html Rose HA for Linux/UNIX, NeoHIGH Technologies, Inc., 2000, www.neohigh.com/nt-wp.htm.

Achieving Continuous Availability With Sybase Adaptive Server Enterprise, Sybase, Inc., 2002, www.sybase.com/detail/1,6904,101310,00.html. Co-StandbyServer FAQ, Software Shelf International, Inc. 2002, www.sotfwareshelf.com/downlaods/misc/csbsfaq.htm.

* cited by examiner

QUASI-HIGH AVAILABILITY HOSTED APPLICATIONS

TECHNICAL FIELD

The invention relates generally to client-server computing including web applications with a browser based client. More particularly the invention relates to a method and system for providing client server applications using a request-response protocol to a client with a quasi-high availability.

BACKGROUND OF THE INVENTION

Client-server applications, including hosted software applications, provided as a services offering need to have a reasonably high availability in order to supply an acceptable service level and prevent customer dissatisfaction due to outages. While a number of techniques have been developed to provide high availability, the cost is usually prohibitive from the standpoint of what a customer is willing to pay for the service offering.

For example, BEA Systems, Inc. describes in a document titled "Using WebLogic Server Clusters," a group of servers that work together to provide a powerful, reliable application platform. A clustered service is one that is available on multiple servers in the cluster. The cluster appears to a client as a single server, but is in fact a group of servers acting as one. If one server fails, another can take over. The ability to fail-over from a failed server to a functioning server increases the availability of the application to a client.

The clustered service is represented by a stub i.e. a local procedure in a remote procedure call (RPC). The stub is aware of all instances of service. The stub appears to the client as a normal remote method invocation (RMI) stub. On each call, the stub employs a load algorithm to choose which instance to call, providing load balancing across the cluster. If a failure occurs during the call, the stub intercepts execution and retries the call on another instance, providing fail-over to the client.

Lidcam Technology of Melbourne Australia describes in a 2001 document titled "ServerIron Internet Web Switches," detection and sub-second fail-over to the next server in a group that provides like service. Their ServerIron switch detects application error conditions such as the hypertext transfer protocol (HTTP) "404 Object not found" before the client sees the message and transparently redirects the request to another server without any manual intervention. To provide very high availability, the ServerIron switch includes redundancy capability that protects against session loss.

Goldszmidt et al. In U.S. Pat. No. 6,195,680 B1 describe a client-server system for fault tolerant delivering a data stream such as live audio or video clips. The client receives the real-time data stream from a primary server in a first set of servers. Upon detecting a failure in either the real-time data stream or the primary server, the client dynamically switches to receiving the real-time data stream from a secondary server in a set of servers disjoint from the first set of servers.

Guenthner et al. In U.S. Pat. No. 6,134,588 describe changing a web browser so that the browser will address its requests to any (or policy-specified) of the available servers in a plurality of servers. If a browser time-out failure occurs, indicating unavailability of a server, the browser selects another server. The browser remembers for a given time period which server IP addresses have failed so that those addresses are not repeatedly tried.

U.S. Pat. Nos. 6,195,680 and 5,134,588 as well as the Lidcam "ServerIron" paper described above shall be incorporated herein by reference.

Despite the aforementioned and other developments, no overall satisfactory solution has been found which provides quasi-high availability of client-server applications including hosted services applications, with low cost.

In accordance with the teaching of the present invention there is provided such a solution. It is believed that this overall solution constitutes a significant advancement in the hosted services application offering art.

OBJECTS AND SUMMARY OF THE INVENTION

It is therefore a principal object of the present invention to enhance the availability of client-server applications.

It is another object to provide a system for providing quasi-high availability client-server or hosted services applications.

It is yet another object of the invention to provide a computer program product for instructing a processor to provide a reliable client-server application.

These and other objects are attained in accordance with one embodiment of the invention wherein there is provided a method of providing a reliable hosted application, comprising the steps of, providing a master configuration and a standby configuration of the hosted application, providing a proxy adapted to accept a request from a client and send the request to the master and standby configurations, processing the request by the master and standby configurations to produce master and standby responses, each of the responses having a respective length, selecting one of the responses, and returning the selected response to the client, and thereafter designating the configuration which produced the selected response as the master configuration.

In accordance with another embodiment of the invention there is provided a system for providing a reliable hosted application, comprising, one or more servers having a master configuration and a standby configuration of hosted application, a proxy on one of the servers, adapted to accept a request from a client and send the request to the master and standby configurations, master and standby responses produced by processing the request by the master and standby configurations respectively, the each of the responses having a respective length, means for selecting one of the responses, and returning the selected response to the client, and means for designating the configuration which produced the selected response as the master configuration.

In yet another embodiment of the invention there is provided a computer program product for instructing a processor to provide a reliable hosted application, the computer program product comprising, a computer readable medium, first program instruction means for providing a master configuration and a standby configuration of the hosted application, second program instruction means for providing a proxy adapted to accept a request from a client and send the request to the master and standby configurations, third program instruction means for processing the request by the master and standby configurations to produce master and standby responses, each of the responses having a respective length, fourth program instruction means for selecting one of the responses, and returning the selected response to the client, and fifth program instruction means for thereafter designating the configuration which produced the selected response as the master configuration; and wherein all the program instruction means are recorded on the medium.

BEST MODE FOR CARRYING OUT THE INVENTION

For a better understanding of the present invention, together with other and further objects, advantages and capabilities thereof, reference is made to the following disclosure and appended claims in connection with the above-described drawings.

Figure 1:
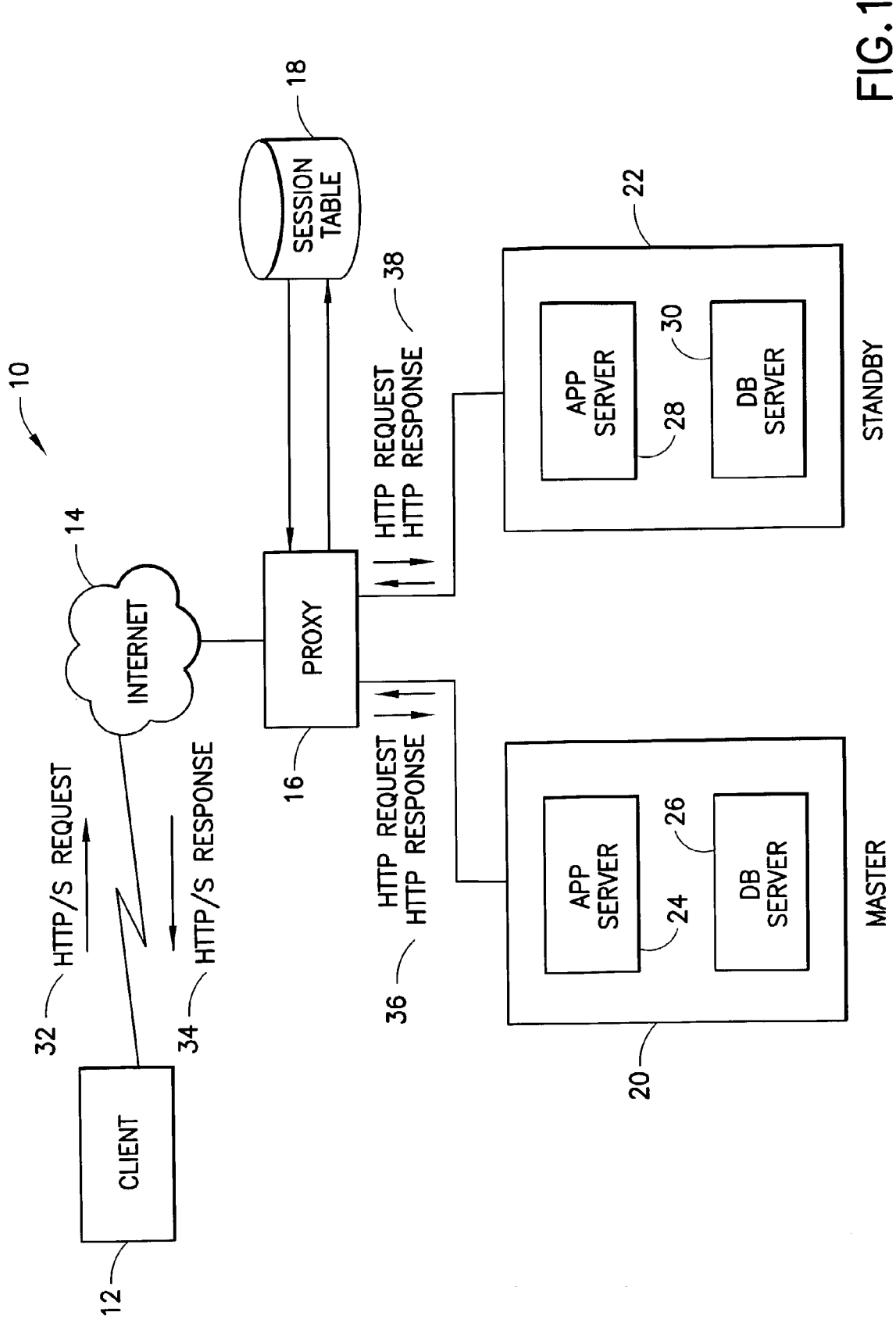
FIG. 1 illustrates a system for providing quasi-high availability of a hosted application.

In FIG. 1 there is shown a system 10 for providing a quasi-high availability hosted application in accordance with the present invention. Master 20 and standby 22 configurations may have application servers 24, 28 and database servers 26, 30 respectively, software running concurrently. The master and standby configurations may be located on different physical hardware computing devices, however, other possibilities known in the art for operating multiple configurations on a single computing device may also be used.

Proxy 16 may be located on a third server side computing device. Proxy 16 receives requests 32 from client 12 over the internet 14 using a specific protocol such as HTTP or HTTP/S.

It is known that the HTTP/S protocol specifies that information passing from client to server and vice-versa also called traffic is encrypted.

If proxy 16 receives a request from a client browser using the HTTP/S protocol, proxy 16 may decrypt the incoming traffic and forward the request to application servers 24, 28 using the unencrypted HTTP protocol. Other protocols such as request-response protocols may also be used.

Proxy 16 sends request 32 to both master 20 and standby 22 configurations. Proxy 16 maintains session object, also referred to as session table 18, using known session management or session tracking techniques including session ID, session timeout, dynamic URL's, and use of cookies. Proxy 16 may substitute the session ID related elements in the requests sent to standby configuration 22 based on previous responses therefrom.

In an embodiment having master 20 and standby 22 configurations running on a single hardware computing device, proxy 16 may also be running on this same computing device without departing from the scope of the invention. Other combinations of software and hardware computing devices may also be used.

Both master 20 and standby 22 configurations process each request 32 independently of the other. Request 32 may involve use of application servers 24, 28 and further may involve inquiries to database servers 26, 30 respectively. Master 36 and standby 38 responses are produced as request 32 is processed by master 20 and standby 22 configurations respectively. Responses 36, 38 are received by proxy 16 and compared to select one for subsequent return to client 12 over internet 14 which may be any type of network including the well-known interconnection of networks referred to as "the internet". The responses may also use HTTP protocol.

Proxy 16 may compare the length of responses 36 and 38 and select the response to be forwarded to client 12. For example, proxy 16 may select the response having a length greater than a fixed value more than the length of the other response. In one embodiment, proxy 16 may scan responses 36, 38 for pre-defined error messages, such as HTTP error messages or application specific error messages, and select the other response not having an error message other methods of selection may also be used.

Upon receipt of a pre-defined error message, proxy 16 may generate an alarm or initiate a recovery process for the configuration which produced the error message in its respective response. The recovery process may include a reset of the unselected configuration and subsequent copying of state related data from the master configuration.

Proxy 16 may also operate by analyzing responses 36,38 for a pre-defined error condition pattern. For example, an error condition pattern may be defined using pattern description rules such as Unix style regular expressions. Proxy 16 attempts to match every response with a pre-defined error condition pattern and selects one of the responses based on a match with the other response.

In the case that the response 38 from standby configuration 22 is selected, the standby configuration is thereafter designated as the master configuration and vice-versa.

System 10 as therefore described above is capable of providing an overall availability much greater than either of configurations 20,22 alone, provided the availability of proxy 16 is that of a reliable proxy. A reliable proxy has an availability high enough so as not to be a substantial limitation to the overall availability of system 10.

Figure 2:
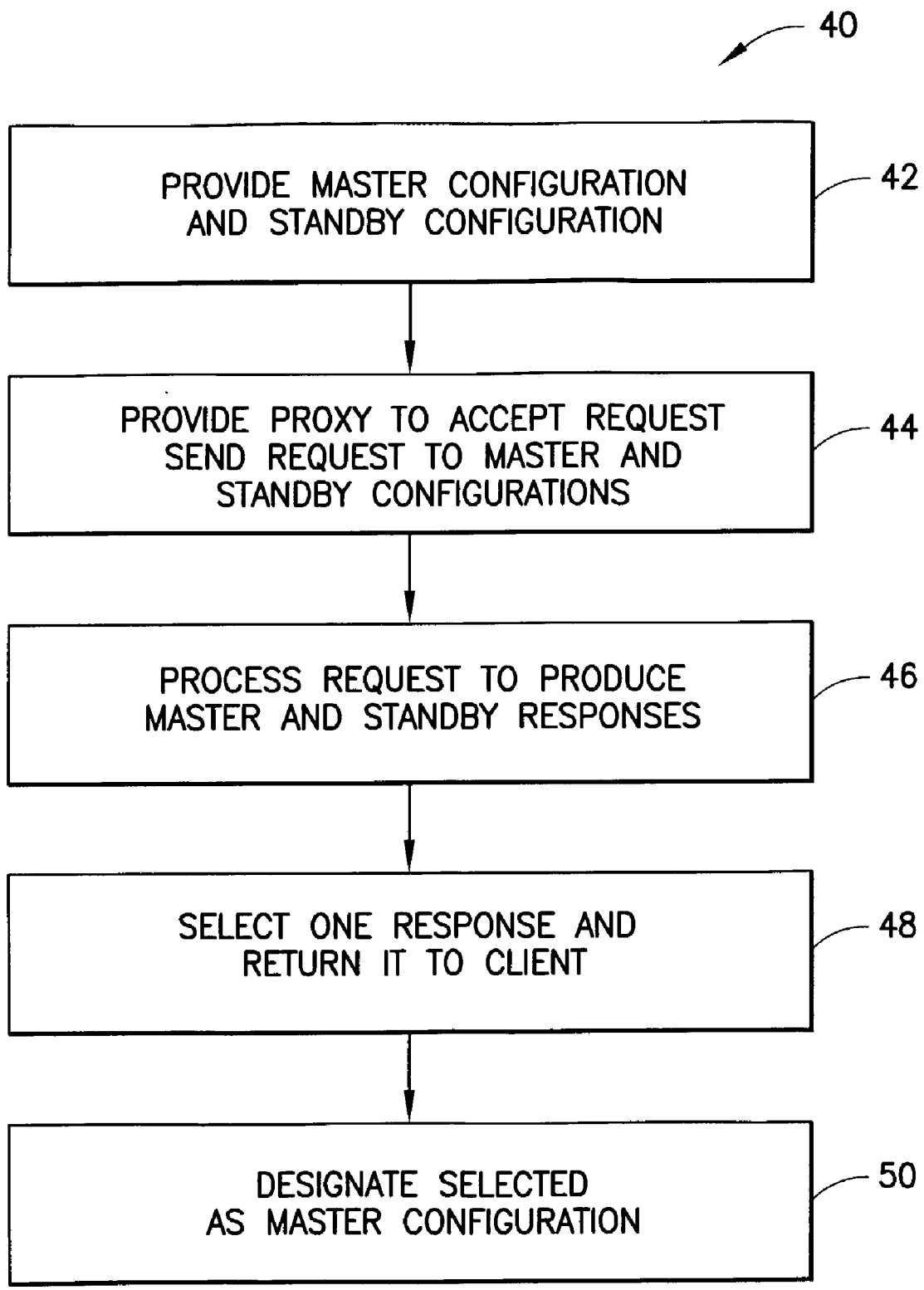
FIG. 2 is a flowchart depicting a method of providing quasi-high availability in accordance with the present invention.

In FIG. 2 there is shown a flowchart 40 of a method of providing a reliable client-server or hosted application in accordance with the present invention. In step 42 master 20 and standby 22 configurations of hosted applications 24, 28 respectively are provided.

In step 44, proxy 16 is provided to accept request 32 over internet 14 and send the request to master 20 and standby 22 configurations.

The requests are processed in step 46 independently to produce master 36 and standby 38 responses respectively, each having a respective length. For example, request 32 may be an HTTP protocol request. Responses 36,38 may each be an HTML file sent via HTTP protocol to proxy 16.

Proxy 16 selects one response in step 48 using any criteria including the length and error code criteria described above. The selected response is sent to client 12 across internet 14 using any protocol including the HTTP protocol.

In step 50 the configuration producing the selected response is thereafter designated as the master configuration.

While there have been shown and described what are at present considered the preferred embodiments of the invention, it will be obvious to those skilled in the art that various modifications made be made therein without departing from the scope of the invention as defined by the appended claims.

What is claimed is:

1. A method of providing a reliable client-server application, comprising the steps of:

providing a master configuration and a standby configuration of said client-server application;

providing a proxy adapted to accept a request from a client and send said request to said master and standby configurations;

processing said request by said master and standby configurations to produce master and standby responses, each of said responses having a respective length;

selecting one of said responses based on said respective length of each of said responses, selecting the response having the length greater than a predefined value more than the other length, and returning the selected response to said client; and thereafter designating the configuration which produced the selected response as the master configuration.

2. A method of providing a reliable client-server application, comprising the steps of:

providing a master configuration and a standby configuration of said client-server application;

providing a proxy adapted to accept a request from a client and send said request to said master and standby configurations;

processing said request by said master and standby configurations to produce master and standby responses, each of said responses having a respective length;

selecting one of said responses based on said respective length of each of said responses, selecting the master response when neither of said respective length is greater than a predefined value more than the other length and not receiving a predefined error message in response to said request, and returning the selected response to said client; and thereafter designating the configuration which produced the selected response as the master configuration.

3. A system for providing a reliable hosted application, comprising:

one or more servers having a master configuration and a standby configuration of said hosted application;

a proxy on one of said servers, adapted to accept a request from a client and send said request to said master and standby configurations;

master and standby responses produced by processing said request by said master and standby configurations respectively, said each of said responses having a respective length;

means for selecting one of said responses based on said respective length of each of said responses, selecting the response having the length greater than a predefined value more than the other length, and returning the selected response to said client; and means for designating the configuration which produced the selected response as the master configuration.

4. A system for providing a reliable hosted application, comprising:

one or more servers having a master configuration and a standby configuration of said hosted application;

a proxy on one of said servers, adapted to accept a request from a client and send said request to said master and standby configurations;

master and standby responses produced by processing said request by said master and standby configurations respectively, said each of said responses having a respective length;

means for selecting one of said responses based on said respective length of each of said responses, selecting the master response when neither of said respective length is greater than a predefined value more than the other length and not receiving a predefined error message in response to said request, and returning the selected response to said client; and means for designating the configuration which produced the selected response as the master configuration.

* * * * *